Nov. 1, 1938.  C. H. FOSTER  2,135,281
SHOCK ABSORBER
Filed Sept. 10, 1937  2 Sheets-Sheet 1
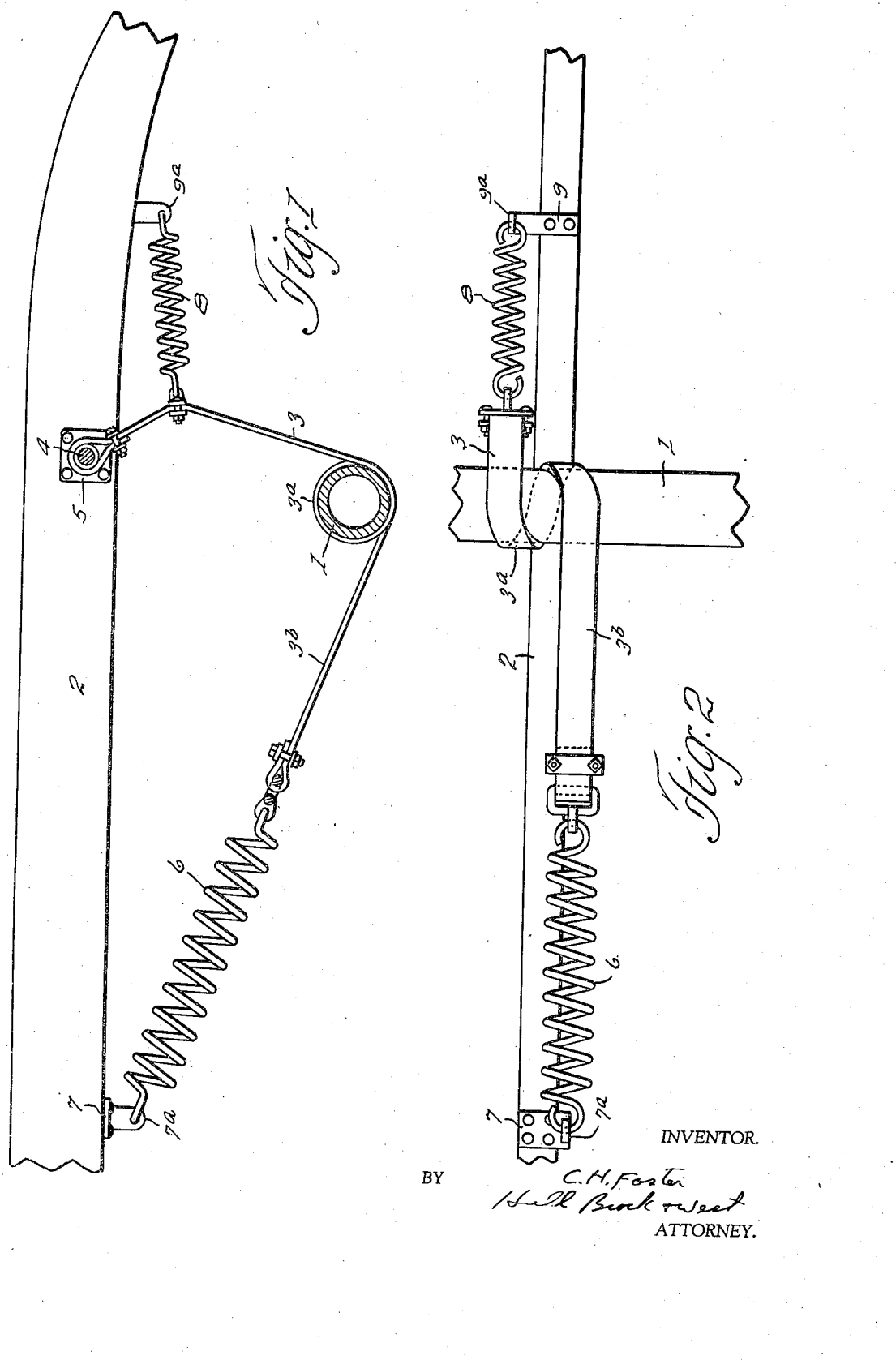
INVENTOR.
C. H. Foster
BY
ATTORNEY.

Nov. 1, 1938.  C. H. FOSTER  2,135,281
SHOCK ABSORBER
Filed Sept. 10, 1937   2 Sheets-Sheet 2
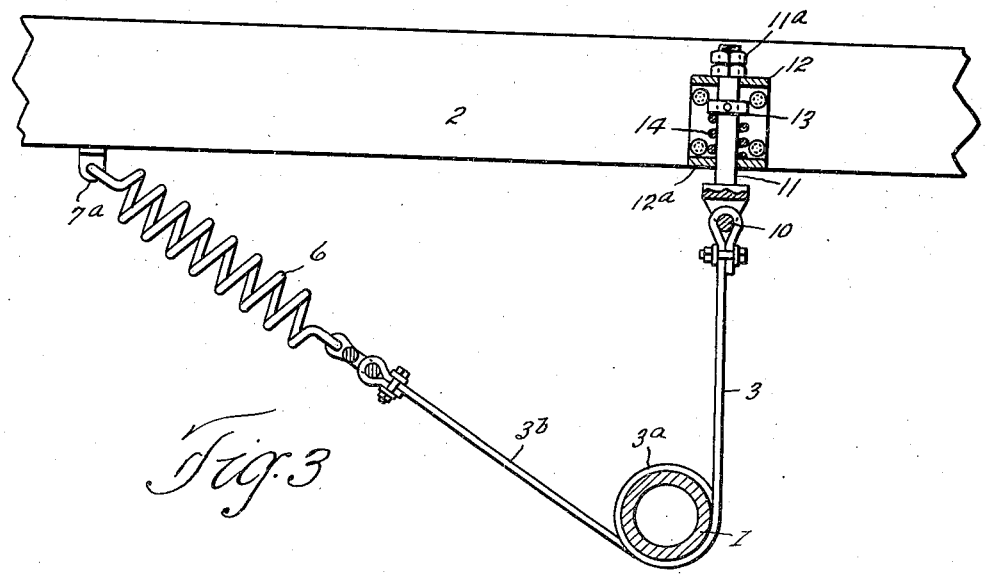
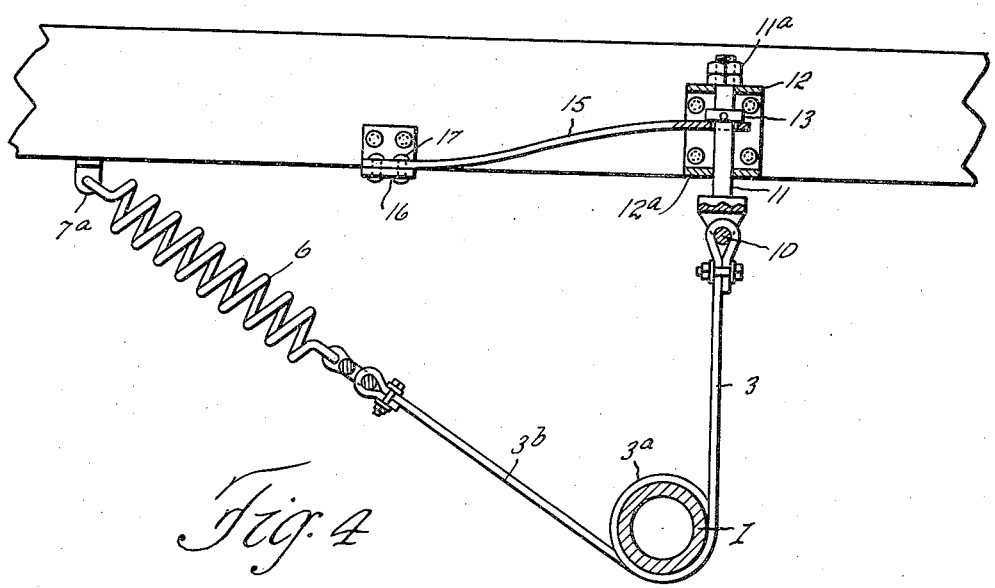
INVENTOR.
C. H. Foster
BY Hull Brock + West
ATTORNEY.

Patented Nov. 1, 1938

2,135,281

UNITED STATES PATENT OFFICE 2,135,281

SHOCK ABSORBER

Claud H. Foster, South Euclid, Ohio

Application September 10, 1937, Serial No. 163,214

8 Claims. (Cl. 267—9)

This invention relates to shock absorbers, and more particularly to the type of shock absorbers known to the trade as "snubbers", which comprise each a pliable member, such as a fabric strap, which is wound about an axle, or a drum mounted thereon, and which has one end connected to a suitable portion of the body or chassis, with a spring connected to its opposite end and serving to take in the slack of the pliable member on the reverse movement of the axle toward the body and to assist the said member in frictionally opposing the separation of the vehicle body and axle after such rebound.

It is the particular purpose and object of my invention to provide a shock absorber or snubber of this general type which is not only extremely simple in construction and inexpensive of production, but which is especially adapted for use on vehicles equipped with the present low-pressure or semi-balloon types of tires.

With the foregoing general object in view, my invention may be defined further as comprising the more limited objects which will be set forth in the specification and covered by the combinations of elements included in the claims hereof.

In the drawings illustrating my invention,—

Fig. 1 represents a portion of one of the side members of an automobile, showing the axle housing in section and illustrating the manner in which my invention is applied to the aforesaid parts;

Fig. 2 represents a bottom plan view of the parts shown in Fig. 1; and

Figs. 3 and 4 are views, similar to Fig. 1, showing modifications of the invention shown in Figs. 1 and 2.

Referring more particularly to the form of my invention shown in Figs. 1 and 2, 1 denotes a rear axle housing and 2 a side member of an automobile. 3 denotes the front end portion of a strap of suitable material, such as fabric belting, having its end secured to a pin 4 carried by a plate 5 fastened to said side member and having an intermediate part 3a wound about the axle housing and having its rear part 3b connected to one end of a helical spring 6, the opposite end of which spring is connected to the depending arm 7a of a plate 7, which may be conveniently secured to the side member 2 or to any other convenient portion of the chassis or body. It will be noted that the support 7a for the spring 6 and the pin 4 on which the front end of the portion 3 of the strap is supported are separated laterally from each other. This is for the purpose of preventing the contiguous edges of the intermediate portion 3a of the strap from engaging each other.

Where cars are equipped with snubbers each embodying the construction thus far described, and where the cars are equipped with the types of tires referred to hereinbefore and are driven over road beds having small irregularities therein, the springs 6 will, under the slight movements of the axles toward the body caused by such small irregularities, continuously pull small increments of the straps around the axle housing until the springs 6 may be greatly contracted. This in turn would create such an amount of friction of the straps upon the axles as to prevent the snubbers from checking effectively the rebound movement of the body away from the axles when the tires pass over higher and more serious obstacles. In order to prevent this action I have connected one end of a short helical spring 8 to the upper portion of the part 3 of the strap of each snubber, the opposite end of each spring being connected to an arm 9a depending from a plate 9 which may be conveniently secured to the side member 2. The arms 9a support the ends of the springs attached thereto in substantially the vertical planes passing through the loops 3c by which the parts 3 of the straps are supported, approximately midway between the sides of said loop.

In practice, with a vheicle under normal load, the springs 6 and 8 have been set so as to exert a tension of about 25 lbs. each.

With the parts constructed and arranged as described, as the tires pass over small irregularities in the road, the springs 8 will keep taut the portions 3 of the straps as the axles and side members approach each other, without permitting the springs 6 to wind the straps around the axle housings and without permitting these springs to contract in length. However, on more violent rebounds, the springs 6 will operate to rotate the straps about the axle housings, against the actions of the shorter springs 8. It should be noted that the resistance of the springs 8 to the pull exerted upon the opposite ends of the straps by the springs 6 is limited, said resistance reaching its maximum when the portions 3 of the straps extend in substantially straight lines between their respective axles and the pins 4. This limitation to the resistance of the springs 8 is an important feature of my invention, since it enables the springs 6 to perform efficiently their functions of permitting the straps to slip freely about their respective axle housings when the wheels pass through depressions of substantial depth, and of cooperating with the straps to check the rebounds which follow after the wheels have climbed the ascending sides of such depressions. It should be noted further that the portions of the straps between the springs 8 and the pins 4 constitute in effect links which serve to connect the parts of the straps below said springs with the members 2.

In Fig. 3 I have shown a modification of my invention wherein the portion 3 of each strap is connected at its upper end to a pin 10 operatively connected to the lower end of a bolt 11 which extends through the top and bottom members 12 and 12a of a channeled frame which is secured to the side member 2. The upper end of the bolt 11 is provided with nuts 11a which serve to limit its downward movement by engagement of the lower of said nuts with the top 12 of the channeled frame. Interposed between the bottom of the channeled frame and a collar 13 on the bolt is a helical spring 14 which serves the same function as the spring 8 in preventing the spring 6 from winding the strap about the axle housing during movements of small amplitude of the axle toward the body or frame. The resistance of the springs 14 to the pull exerted on the opposite ends of the straps by the springs 6 is limited by the length of the downward strokes of the pins 11, which limitation is effected by the collars 13. It will be evident that this form of my invention operates in substantially the same manner as does that illustrated in Figs. 1 and 2.

In Fig. 4, there is shown a still further modification of the invention wherein the bolt 11 extends through an opening in the outer upwardly flexed end of a flat spring 15 having its opposite end secured to the side member 2, as by means of an L-shaped plate 16 and rivets 17. The construction shown in Fig. 4 operates in the same manner as do those shown in substantially the preceding views.

In the forms of my invention shown in Figs. 3 and 4, the pins 11 constitute in effect links which connect the portions 3 of the straps therebelow with the frame members 2.

Having described my invention, what I claim and desire to secure by Letters Patent is:—

1. The combination, with a vehicle frame member and an axle member, of a pliable member wrapped about the axle member, a helical spring connected at one end to an end of the said pliable member and at its opposite end to a portion of the vehicle body, and means including a second spring for connecting the opposite end of said strap to the vehicle member, the second spring being operative to prevent the winding of the strap about the axle member by the first mentioned spring through movements of small amplitude of the axle member toward the said frame member and having a limited movement in opposition to the movement of the first spring in a direction to wind the strap about the axle member.

2. The combination, with a vehicle frame member and an axle member, of a strap wrapped about the axle member, a helical spring connected at one end to an end of said strap and at its opposite end to a portion of the vehicle body, and link means connecting the opposite end portion of said strap to said frame member, a spring connected to the said link means and preventing the winding of the strap about the axle member by the first mentioned spring through movements of small amplitude of the axle member toward the said frame member, said link means limiting the movement of the second spring in a direction to oppose the winding of the strap about the axle member by the first mentioned spring.

3. In the combination recited in claim 2, the support for the first mentioned spring and the support for the opposite end of the strap being laterally separated to prevent engagement of the contiguous portions of the strap that are wrapped about the axle member.

4. The combination, with a vehicle frame member and an axle member, of a pliable member wrapped about the axle member, a helical spring connected at one end to an end of the said pliable member and at its opposite end to a portion of the vehicle body, means connecting the opposite end of the said strap to the said frame member, and a helical spring connected at one end to the portion of the said pliable member between the axle member and the frame member and at its opposite end to said frame member.

5. In the combination recited in claim 4, the supports for the said springs being laterally spaced.

6. The combination, with a vehicle frame member and an axle member, of a strap wrapped about the said axle member, a helical spring connected at one end to an end of said strap and at its opposite end to a portion of the vehicle body, a bolt reciprocably supported by the said frame member and connected to the opposite end of said strap, a helical spring surrounding the said bolt and operative to prevent the winding of the strap about the axle member by the first mentioned spring through movements of small amplitude of the axle member toward the said frame member, and cooperating means carried by said bolt and by said frame member for limiting the movement of the second spring in a direction to oppose the winding of the strap about the axle member by the first mentioned spring.

7. The combination, with a vehicle frame member and an axle member, of a strap wrapped about the said axle member, a helical spring connected at one end to an end of said strap and at its opposite end to a portion of the vehicle body, a bolt reciprocably supported by the said frame member and connected to the opposite end of said strap, a flat spring having one end secured to the frame member and curved away therefrom and having at its opposite end an aperture through which the said bolt extends, the bolt having a projection engaging the said spring, whereby the last mentioned spring operates to prevent the winding of the strap about the axle member by the first mentioned spring through movements of small amplitude of the axle member toward the said frame member.

8. In the combination recited in claim 6, the supports for the springs being laterally spaced.

CLAUD H. FOSTER.